United States Patent
Endres et al.

(10) Patent No.: US 9,273,712 B2
(45) Date of Patent: Mar. 1, 2016

(54) FASTENING SYSTEM WITH ECCENTRIC

(71) Applicant: Wittenstein AG, Igersheim (DE)

(72) Inventors: Jochen Endres, Hemmersheim (DE); Marco Heckmann, Ahorn-Schillingstadt (DE)

(73) Assignee: Wittenstein AG, Igersheim (DE)

(*) Notice: Subject to any disclaimer, the term of this patent is extended or adjusted under 35 U.S.C. 154(b) by 0 days.

(21) Appl. No.: 14/450,563

(22) Filed: Aug. 4, 2014

(65) Prior Publication Data
US 2015/0043990 A1 Feb. 12, 2015

(30) Foreign Application Priority Data
Aug. 9, 2013 (DE) .................. 10 2013 108 650

(51) Int. Cl.
*F16B 39/22* (2006.01)
*F16B 19/02* (2006.01)
*F16B 21/02* (2006.01)
*F16B 5/02* (2006.01)
*F16C 29/00* (2006.01)
*F16H 55/26* (2006.01)

(52) U.S. Cl.
CPC . *F16B 19/02* (2013.01); *F16B 5/02* (2013.01); *F16B 21/02* (2013.01); *F16C 29/004* (2013.01); *F16C 2322/39* (2013.01); *F16H 55/26* (2013.01)

(58) Field of Classification Search
CPC ........... F16B 19/02; F16B 21/02; F16B 39/22
USPC .............. 411/273, 337, 372.5, 373, 382, 383, 411/396
See application file for complete search history.

(56) References Cited

U.S. PATENT DOCUMENTS

| | | | | |
|---|---|---|---|---|
| 2,430,613 A | * | 11/1947 | Hodge | ............... 269/138 |
| 3,408,924 A | | 11/1968 | Mueller | |
| 3,447,821 A | * | 6/1969 | Bochory | ............... 285/148.27 |
| 3,480,311 A | * | 11/1969 | Lanham Jr. | ............... 403/408.1 |
| 4,613,000 A | | 9/1986 | Moore | |
| 4,887,915 A | | 12/1989 | Forster | |
| 5,129,637 A | | 7/1992 | Ito et al. | |
| 5,324,148 A | * | 6/1994 | Notaro | ............... 411/396 |
| 5,697,746 A | * | 12/1997 | Brown et al. | ............... 411/396 |
| 6,805,488 B2 | | 10/2004 | Ito | |

(Continued)

FOREIGN PATENT DOCUMENTS

| | | |
|---|---|---|
| DE | 1750591 A1 | 2/1971 |
| DE | 3810205 A1 | 11/1988 |

(Continued)

OTHER PUBLICATIONS

European Office action for Application No. 14178886.9 dated Feb. 10, 2015.

*Primary Examiner* — Robert A Delisle
(74) *Attorney, Agent, or Firm* — Bachman & LaPointe, P.C.

(57) ABSTRACT

Fastening system for a linear machine element (2, 102) for fastening in a machine foundation (4), having a clamping element which has a shank (35) and a head (37), wherein the diameter of the head (37) is greater than the diameter of the shank (35), and having an eccentric (60) which comprises a sleeve (68) with an eccentric bore (66) and a torque-transmitting element (70), wherein the outer diameter of the head (37) is smaller than the inner diameter of the bore (66) or at least substantially corresponds to the inner diameter of the bore (66).

11 Claims, 4 Drawing Sheets

(56) References Cited

U.S. PATENT DOCUMENTS

| | | |
|---|---|---|
| 6,997,660 B2 * | 2/2006 | Fedor .......................... 411/383 |
| 2005/0084361 A1 * | 4/2005 | Fly ............................... 411/107 |
| 2009/0162141 A1 | 6/2009 | Borgman et al. |
| 2010/0129149 A1 | 5/2010 | Metz et al. |

FOREIGN PATENT DOCUMENTS

| | | |
|---|---|---|
| DE | 102007021731 A1 | 11/2008 |
| EP | 0474397 A1 | 3/1992 |
| FR | 2839912 A1 | 11/2003 |
| JP | 2003127037 A | 5/2003 |

\* cited by examiner

FASTENING SYSTEM WITH ECCENTRIC

BACKGROUND OF THE INVENTION

The invention relates to a fastening system for a linear machine element and to an eccentric, a linear machine element and a method for the fastening of a linear machine element.

For the mounting of linear machine elements, in particular toothed racks or linear guides, it is important for the machine elements to be pressed against a machine foundation, and oriented correctly, over the entire length. This is necessary in particular in high-precision applications. From the prior art, methods are known in which a machine element is pressed against the machine foundation by means of a screw clamp and subsequently fixed by means of screws. This is an iterative process because toothed racks, for example, can be pressed on only over a short distance by means of a screw clamp. When the toothed rack has been fastened at that location, the screw clamp at the next location is tightened in order to fix the toothed rack again there. Further disadvantages are that it is not possible for any desired number of screw clamps to be provided, that the tightening of the screw clamps can be inconvenient owing to the obstructions posed by the machine foundation, and that the screw clamps restrict access to the screws.

A further problem during the mounting process is the setting of the distance between two toothed racks. Here, it is normally the case that, firstly, a mounting aid which has the inverse toothed form is pressed over both ends of the toothed racks by means of a screw clamp, and then the toothed rack to be newly mounted is screwed on loosely. The fine adjustment is subsequently performed in percussive fashion by means of a hammer and pestle, wherein the pestle is in part also engaged directly on the tooth flanks.

EP 474 397 A1 describes a device for the mounting of linear guides on a machine foundation by means of a bolt which can be rotatably arranged in a bore of the machine foundation and by means of the head of which the linear guide can be pressed against an abutment of the machine foundation. Here, the head is formed eccentrically with respect to a central axis of the bolt. To secure the position of the linear guide in the direction of the longitudinal axis of the bolt, it is necessary for additional clamping elements to be provided.

For the arrangement of the bolts adjacent to the linear guide, separate bores in the machine foundation are required. This entails increased outlay and is therefore undesirable. The large number of parts required can give rise to high production costs and a cumbersome mounting process.

It is an object of the invention to improve fastening systems known from the prior art for linear machine elements. In particular, a simple construction, or uncomplicated, fast mounting, should be possible. Furthermore, high precision or load capacity is desirable. Production costs should be lowered. It should be possible for linear machine elements to be mounted in a reliable manner by way of a simple mounting process.

SUMMARY OF THE INVENTION

The object is achieved by means of a fastening system for a linear machine element by means of an eccentric, by means of a linear machine element and by means of a method for the fastening of a linear machine element.

Typical embodiments concern a fastening system for fastening a linear machine element in a machine foundation, having a clamping element which has a shank and a typically circular head. The diameter of said head is normally greater than the diameter of the shank. This permits tightening against the linear machine element. Furthermore, typical embodiments comprise an eccentric which comprises a sleeve with a circular bore which is eccentric with respect to the outer circumference of the sleeve. Furthermore, typical eccentrics comprise a torque-transmitting element. Typical torque-transmitting elements are nuts, hexagonal sockets, Allen connectors or other structures which permit the engagement of a tool for rotating the eccentric about its longitudinal axis. The longitudinal axis is the axis that is typically oriented parallel to the axis of the clamping element. In typical embodiments, as clamping element, use is made of screws or bolts, typically with a head which permits the engagement of a tool for rotating and clamping the clamping element. A typical head comprises an Allen connector or a Torx connector. The outer diameter of the head of the clamping element is typically smaller than the inner diameter of the bore, or typically corresponds at least substantially to the inner diameter of the bore. Mounting of the eccentric on the head is thus made possible. In typical embodiments, the bore is of such a size that the eccentric can be mounted on the head. In some exemplary embodiments, additional adaptation sleeves are provided between the head and the sleeve in order to compensate for the sleeve having an inner diameter that differs from the outer diameter of the head.

Embodiments of linear machine elements include in particular toothed racks or linear guides. In the case of toothed racks as linear machine elements, embodiments offer the advantage, for example, that positioning of a toothing of the toothed rack relative to a reference point is possible in a precise manner. In the case of linear guides as machine elements, embodiments offer the advantage, for example, that mounting is facilitated.

Typical embodiments concern an eccentric for a fastening system for a linear machine element.

Typical eccentrics for fastening systems described herein comprise a sleeve with an eccentric bore. The bore is normally circular and oriented eccentrically with respect to the outer circumference or the outer contour of the sleeve. In typical embodiments of eccentrics of the invention, a torque-transmitting element is arranged on one axial end. The torque-transmitting element is typically manufactured in one piece with the sleeve or is fixedly connected to the sleeve by means of a joining process, for example welding. The bore is typically oriented in the axial direction in the eccentric and extends through the sleeve and the torque-transmitting element. Embodiments comprise free access to the clamping element when the eccentric is mounted. This is realized for example by means of the bore which extends through the torque-transmitting element. It is thus possible, after the toothed rack has been positioned, for the clamping element to be tightened by virtue of the eccentric being rotated.

In typical embodiments, the outer contour of the sleeve of the eccentric is of circular form. The outer contour of the sleeve is expediently of cylindrical form. A cylindrical embodiment is easy to produce. In further embodiments, the outer contour of the sleeve is in the form of a cam or a semiellipse.

The bore typically comprises a step. Here, the step normally divides the bore into a first section in the region of the torque-transmitting means and a second section in the region of the sleeve. Here, the sections typically have different diameters and are both circular. The step may form a defined abutment in order to facilitate correct mounting of the eccentric on the clamping element. In further embodiments, the bore has a constant diameter. This can facilitate manufacture.

Typical embodiments of linear machine elements for embodiments of fastening systems described herein comprise a through-opening in which the clamping element and at least a part of the sleeve of the eccentric are or can be received. Such linear machine elements offer the advantage that they can be mounted quickly.

The opening in the linear machine element typically comprises a shoulder. In this way, it is possible to create a first region for the sleeve of the eccentric and the head of the clamping element and a second region for a part of the shank of the clamping element. An abutment surface for the head of the clamping element is thus created. Typical embodiments comprise at least one opening which is formed, on a first side of the shoulder, as a circular hole with a first, relatively large diameter, and on a second side of the shoulder, as a circular hole with a second, relatively small diameter. Further typical embodiments comprise at least one opening which is formed, on a first side of the shoulder, as a slot and, on a second side of the shoulder, as a circular hole. In the case of the eccentric being tightened in a slot, a definitive introduction of force can be generated. Owing to the pressing of the sleeve of the eccentric against a planar surface, no transverse forces are generated, and furthermore, a self-locking action is realized. Independent adjustment capabilities in two axial directions can be realized by means of horizontally or longitudinally oriented and vertically or transversely oriented slots. The width of the slot is normally greater than the diameter of the circular hole. In this way, clamping of the clamping element against the shoulder of the at least one opening is possible in all mounting positions. The diameter of the circular hole is typically smaller than the diameter of the eccentric or smaller than the diameter of the head. A shoulder for the abutment of the head is created in this way. In typical embodiments, the sleeve of the eccentric is shorter than a length of the opening or a width of the linear machine element in the cross section of the opening. In typical embodiments, the sleeve can be received entirely in the machine element or in the slot of the opening. This permits a particularly compact construction. In typical embodiments, the eccentric does not engage into the machine foundation. Bracing at this location is thus avoided. The eccentric can typically be mounted on the clamping element. This enables the eccentric to be removed after the clamping of the clamping element.

Typically, at least some of the slots of the openings are oriented in the longitudinal direction of the linear machine element or horizontally. Slots oriented in the longitudinal direction offer the advantage that the linear machine element can be pressed against a linear machine foundation step. In typical embodiments, all of the slots of the openings are oriented in the longitudinal direction of the linear machine element or horizontally. Weakening of the toothed rack is thus minimized. In embodiments, at least some of the slots of the openings are oriented transversely with respect to the longitudinal direction of the linear machine element or vertically. Such slots may provide a degree of adjustability or displaceability in the longitudinal direction under the action of the eccentric. A vertically oriented slot provides axial adjustability using the eccentric. As the eccentric is rotated, the linear machine element can be moved axially and thus adjusted relative to another linear machine element. In embodiments, at least one vertically oriented slot and at least one horizontally oriented slot are provided. It is thus possible for various functions to be fulfilled. It is thus possible, with embodiments, for a linear machine element to be pressed on and likewise for two linear machine elements to be adjusted relative to one another.

In typical embodiments of fastening systems, the shank of the clamping element comprises a thread for engagement into a threaded opening of the machine foundation. This permits simple and reliable mounting. Further clamping elements include a bayonet connection, spring elements or other positively locking connections such as splined shaft connections for connecting to the machine foundation.

In typical embodiments with a slot, the straight length of the slot amounts to at most 20% or at most 10% of the diameter perpendicular to the straight length or at most 5 mm or at most 3 mm. Here, the straight length typically refers to the distance between the two semicircles that delimit the opening. The slots could be manufactured by means of laser cutting or could be milled. In typical embodiments, a multiplicity of openings in the linear machine element is provided, each with one eccentric. With a multiplicity of openings, it is for example possible for the linear machine element to be connected to a machine foundation in a defined manner at multiple locations.

In typical methods, pressing of the linear machine element against the machine foundation is realized by means of an eccentric. By means of a rotation of the eccentric, the linear machine element is pressed on owing to the eccentricity. The eccentric is typically designed so as to exhibit a self-locking action. In embodiment variants of the method of the invention, the eccentric is secured against rotation, during the tightening of the clamping element, for example by means of a key or an attachment part for the torque-transmitting element. It is typically the case that one eccentric is provided per opening. It is however also possible for more openings to be provided than there are eccentrics, for example in order to realize flexible mounting capabilities.

Typical methods of embodiments for the fastening of a linear machine element with at least one opening, in particular a toothed rack or a linear guide, in a machine foundation by means of a fastening system in one of the embodiments described herein comprise orienting the machine element in the machine foundation, inserting the clamping element into the at least one opening of the machine element, inserting the at least one eccentric into the at least one opening, preferably into the slot of the opening, of the machine element, and mounting the eccentric on the head of the clamping element. The eccentric is typically oriented in the opening, preferably in the slot of the opening, in order to position the machine element. Subsequent clamping of the clamping element serves for the fixing of the machine element in the machine foundation.

After the fixing of the machine element, it is optionally possible, in embodiments, for pinning to be carried out. For this purpose, pin openings, which may be partially pre-drilled in the machine element or the machine foundation, are typically drilled and provided with pins. The pins may be pressed in. Such additional pinning can increase the rigidity of the connection and can facilitate re-assembly after a later dismounting process.

Embodiments yield a time saving during the mounting process and an increase in convenience. Furthermore, by means of typical eccentrics, the pressing action against the machine foundation can be maintained after the mounting process. In embodiments, the eccentrics may be removed after the tightening of the clamping element. As an alternative to remaining in the linear machine element, it is possible, in embodiments, for the eccentric to be removed again after the mounting process and used for further mounting processes. Additional friction forces typically arise between the linear machine element and the machine foundation. This increases security or makes it possible for the clamping elements to be of smaller dimensions. A further advantage may consist in that the linear machine element can be fixed by means of the eccentric by one person. The positioning of a linear machine element relative to an already-mounted linear machine element is possible in a simple and precise manner. Since it is not imperatively necessary for additional bores to be provided in the machine foundation, and the mounting time is shortened, mounting costs are reduced. Since no additional openings are required in the linear machine element for the mounting process, rigidity is not influenced.

BRIEF DESCRIPTION OF THE DRAWINGS

Further advantages and features of preferred embodiments of the invention will be explained below on the basis of the appended drawings, wherein, in the figures.

DETAILED DESCRIPTION

Typical embodiments will be described below on the basis of the figures, wherein the invention is not restricted to the exemplary embodiments; the scope of the invention is rather defined by the claims. FIGS. 1-7 show typical embodiments or parts of typical embodiments. For the description of all of the figures, the same reference signs will be used for corresponding parts and will not be described repeatedly in conjunction with each individual figure. Some features or parts are identical in the various embodiments and will not be repeatedly explained in detail.

Figure 1:
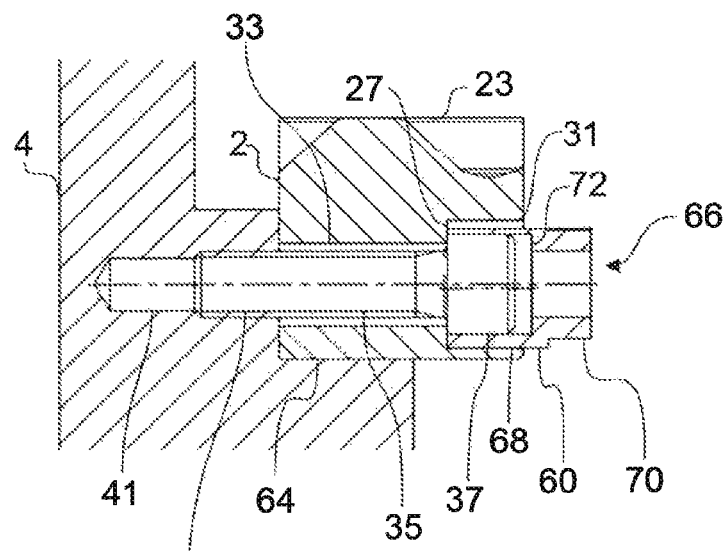
FIG. 1 is a schematic illustration of a part of a typical embodiment in a cross section.

FIG. 1 shows, in a cross section, a cross section through an embodiment of a fastening system for the fastening of a linear machine element. In the embodiment of FIG. 1, a linear machine element 2 in the form of a toothed rack is provided.

The linear machine element 2 comprises a toothing 23 which is of oblique form. Also visible in the cross section of FIG. 1 is an opening which extends through the linear machine element 2. The opening comprises a shoulder 27. The shoulder 27 separates a first side of the shoulder 27 from a second side of the shoulder 27. The first side of the shoulder 27 is in the form of a slot 31. The second side of the shoulder 27 is in the form of a circular hole 33. A clamping element with a shank 35 and a head 37 is received in the opening with the slot 31 and the circular hole 33. The diameter of the head 37 is greater than the diameter of the circular hole 33. As a result, the head 37 can abut against the shoulder 27, such that the shoulder 27 is utilized as an abutment.

The clamping element is received by way of a thread 39 in a threaded opening 41 of a machine foundation 4. By virtue of the clamping element being tightened in the threaded opening 41, the linear machine element 2 is pressed against the machine foundation 4 so as to be secured in position.

In order to arrange the linear machine element 2 in a defined position on the machine foundation 4, the linear machine element 2 can be pressed against an abutment surface 64 of the machine foundation 4 by means of an eccentric 60, which will be explained in more detail in conjunction with FIG. 2. In the eccentric 60 there is provided a bore 66 which extends in an axial direction through the eccentric 60. The eccentric 60 comprises a sleeve 68 and a torque-transmitting means 70. The bore 66 is arranged eccentrically with respect to the sleeve 68. This means that the central axis of the bore 66 is eccentric with respect to a central axis of the outer surface of the sleeve 68. The bore 66 comprises a step 72 which makes it possible for a greater inner diameter to be provided in the region of the sleeve 68 than in the region of the torque-transmitting means 70.

In typical embodiments, a step of the bore offers the advantage that, in the region of the torque-transmitting means, a relatively large material cross section is available, for example for forming an external hexagon or an external tetragon. By contrast, in the region of the sleeve, the diameter may be larger in order to offer adequate space for the head of the clamping element. In further embodiments, in order to facilitate production, the bore is provided with a uniform inner diameter without a step.

Figure 3:
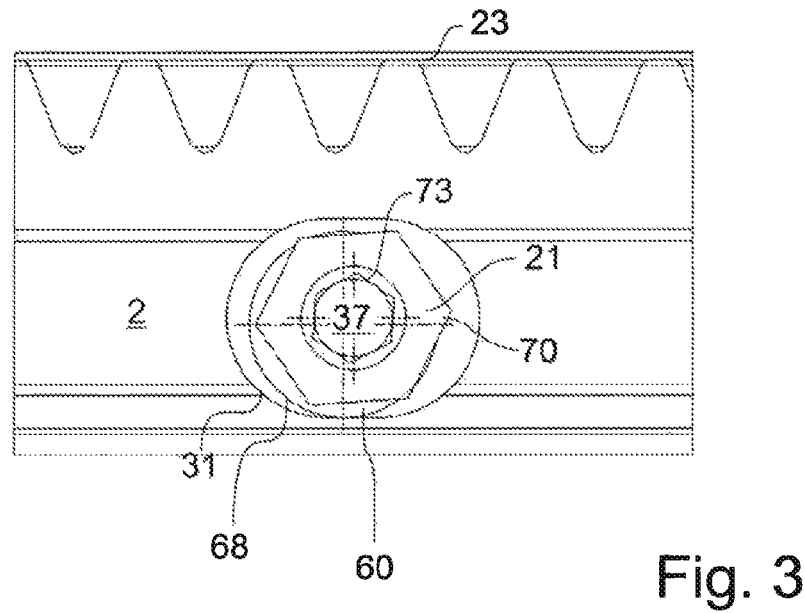
FIG. 3 shows a side view of a part of the exemplary embodiment of FIG. 1.

The head 37 comprises a hexagonal socket 73 which is shown in FIG. 3. By means of the hexagonal socket 73, the clamping element can be tightened even when the eccentric 60 is in a mounted or inserted state, because a hexagonal socket key can be guided to the head 37 through the bore 66.

Below, an explanation will also be given of FIGS. 2 to 4, which relate to the embodiment shown in FIG. 1. Accordingly, FIG. 2 shows an eccentric which may be used in typical embodiments or which also itself constitutes an independent aspect of the invention.

Figure 2:
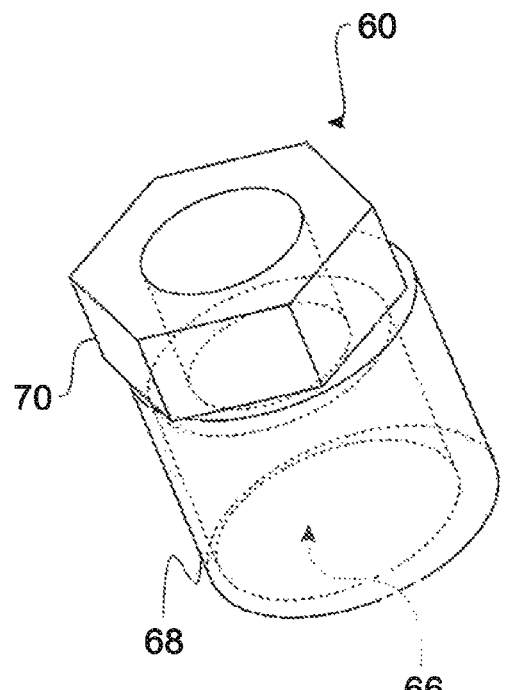
FIG. 2 shows an eccentric of typical embodiments, such as is also used in the exemplary embodiment of FIGS. 1 and 3.

FIG. 2 shows the eccentric 60 in a perspective view, wherein obscured edges are shown by dotted lines. In FIG. 2, and also in FIG. 3, it is possible to clearly see a hexagon as the torque-transmitting means 70. By engaging a hexagonal key on the torque-transmitting means 70, the eccentric 60 can be rotated. Here, in the exemplary embodiment of FIGS. 1 and 3, the eccentric 60 is rotated about the head 37 of the clamping element.

FIG. 3 shows a side view of the exemplary embodiment of FIG. 1. It is possible here to see how the eccentric 60 presses by way of the sleeve 68 against the inner circumference of the slot 31. In this way, the linear machine element 2 is pressed in a downward direction in FIG. 3 against an abutment surface of the machine foundation (not shown in FIG. 3).

In further embodiments, the eccentric is used in order, for example, to displace toothed racks in an axial direction, wherein a precise displacement is possible by means of a rotation of the eccentric. In such embodiments, openings with vertical slots or slots oriented transversely with respect to the longitudinal direction may be provided additionally or exclusively.

Figure 4:
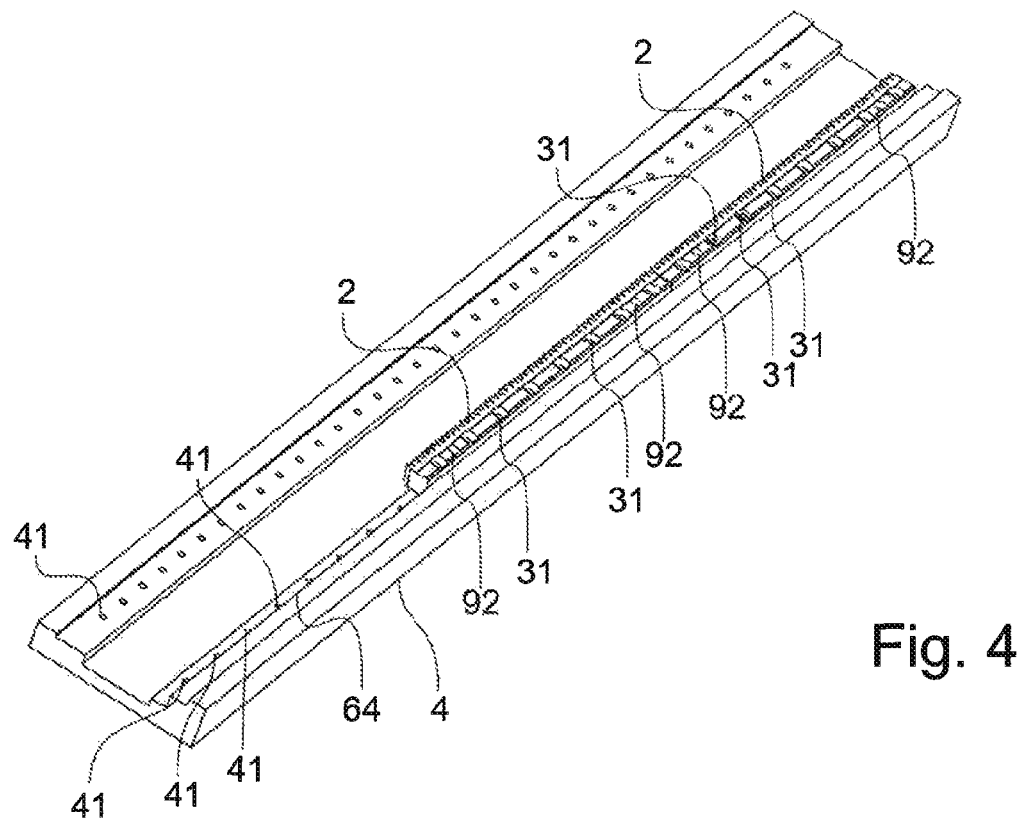
FIG. 4 shows the exemplary embodiment of FIGS. 1 and 3 in a perspective view.

The exemplary embodiment of FIGS. 1 and 3 is shown in a perspective view in FIG. 4. Two linear machine elements 2, which are in the form of toothed racks, are fastened to the machine foundation 4. The linear machine elements 2 of FIG. 4 are fastened to the machine foundation 4 as shown in FIGS. 1 and 3. The linear machine elements 2 have only slots 31 that are oriented horizontally or in the axial direction of the linear machine element 2. The slots 31 of the openings of the linear machine element 2 need not all be equipped with clamping elements, though this is possible if a particularly rigid connection is desired. For a lower rigidity, it is also possible to use fewer clamping elements than there are slots of openings.

In exemplary embodiments like that of FIG. 4, the eccentrics 60 may be used multiple times, for example by virtue of initially the left-hand one of the linear machine elements 2 being fastened and subsequently the right-hand one of the linear machine elements 2 being fastened. For this purpose, the eccentrics 60 are initially inserted into the slots 31 of the left-hand linear machine element 2, and are removed again after the tightening of the clamping elements of the left-hand linear machine element 2. The eccentrics 60 are then inserted, with new clamping elements, into the slots 31 of the openings of the right-hand machine element 2. Here, after the clamping elements have been screwed loosely into the threaded openings 41 of the machine element 4, the eccentrics 60 are mounted onto the heads of the clamping elements such that the sleeves 68 of the eccentrics 60 abut against the shoulder 27 (see FIG. 1) of the openings. The eccentrics 60 are subsequently rotated such that the linear machine element 2 is pressed against the machine foundation 4. It is then possible for the clamping elements to be tightened by engagement of a hexagonal socket key through the bore 66 into the hexagonal socket 73. The mounting process is extremely fast and simple and reliable. In the linear machine elements 2 there are provided pin openings 92 which may optionally be used for additional pinning of the linear machine elements 2. As is the case with the threaded openings 41, not all of the relatively small pin openings 92 or the relatively large slots 31 are provided with a reference sign in FIG. 4, this being so in order to improve clarity. This also applies analogously to FIG. 7.

Figure 5:
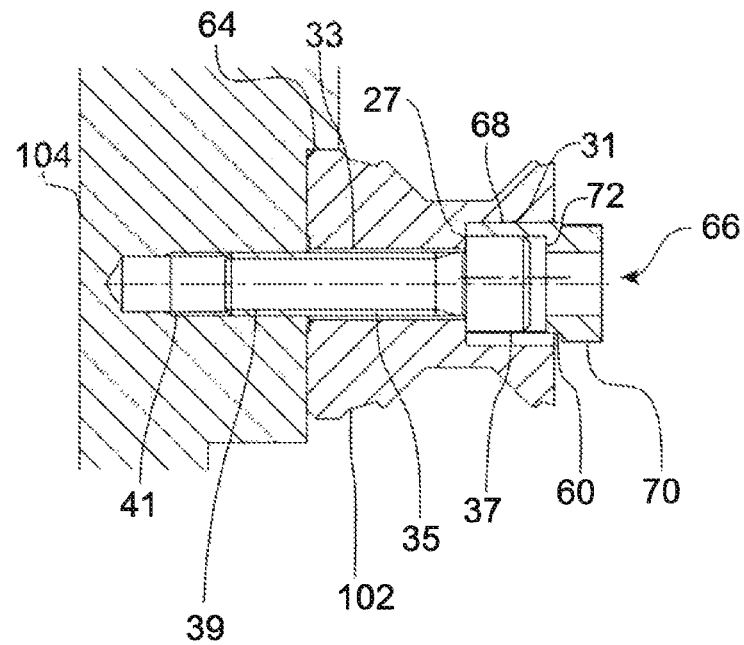
FIG. 5 shows a part of a further exemplary embodiment in a cross section.
Figure 6:
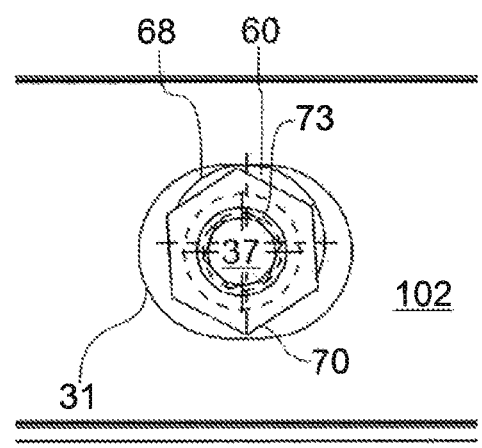
FIG. 6 shows a part of the exemplary embodiment of FIG. 5 in a side view.
Figure 7:
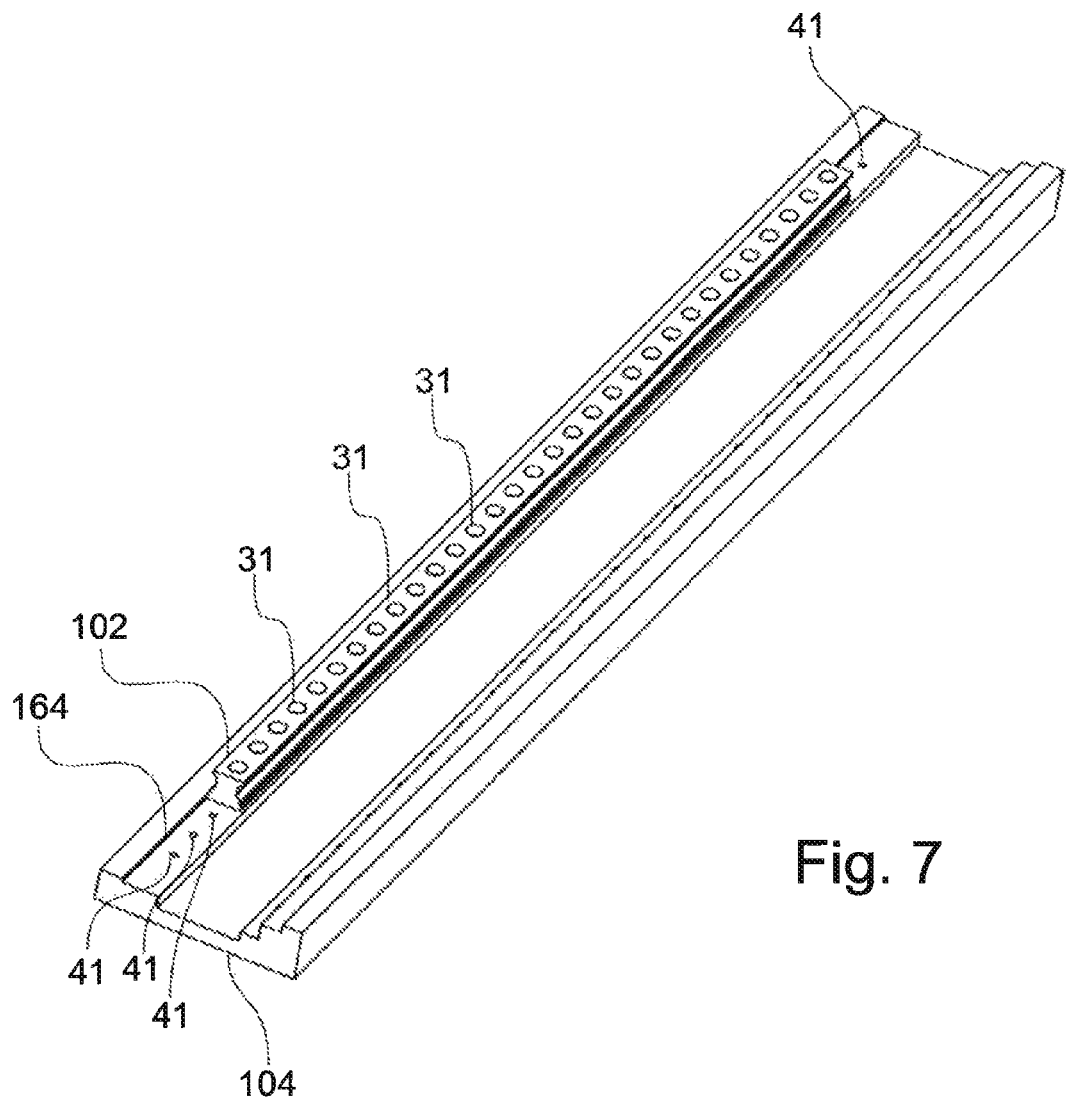
FIG. 7 shows the exemplary embodiment of FIGS. 5 and 6 in a perspective view.

FIGS. 5 to 7 show a further exemplary embodiment. The exemplary embodiment of FIGS. 5 to 7 concerns a linear machine element 102 in the form of a linear guide. Again, the same reference signs are used for identical parts or similar parts, and said parts are not explained again; reference is rather made to the description of FIGS. 1 to 4. In particular, the eccentric 60 of the exemplary embodiment of FIGS. 5 to 7 corresponds to the eccentric of the exemplary embodiment of FIGS. 1 to 4. In general, however, it is pointed out that, in embodiments, use may also be made of other eccentrics, for example eccentrics with some other torque-transmitting element, for example a Torx connector.

Like the linear machine element 2 of the exemplary embodiment of FIGS. 1, 2 and 4, the linear machine element 102 in the form of a linear guide is also pressed against an abutment surface 164 by virtue of the eccentric 60 being rotated such that the sleeve 68 presses against the inner wall of a slot 31. Again, as in the exemplary embodiment of FIGS. 1, 2 and 4, tightening of the clamping elements in the threaded opening 41 is used to position the linear machine element 102. The linear machine element 2 in the form of a linear guide comprises only openings with slots 31 oriented in the longitudinal direction or horizontally. This makes the construction particularly simple.

The invention claimed is:

1. Fastening system for a linear machine element having a toothed rack or a linear guide for fastening in a machine bed, comprising:
   a clamping element having a shank and a head, wherein the head has a diameter which is greater than the shank diameter;
   an eccentric comprising a sleeve having an eccentric bore and a torque-transmitting element, wherein the diameter of the head is smaller than the eccentric bore diameter;
   a linear machine element having a through-opening in which the clamping element and the sleeve of the eccentric are received; and
   wherein the shank of the clamping element comprises a thread engaging with a threaded opening of the machine bed.

2. Fastening system according to claim 1, wherein the torque-transmitting element is arranged concentrically with respect to the eccentric bore.

3. Fastening system according to claim 1, wherein the eccentric bore extends through the torque-transmitting element.

4. Fastening system according to claim 1, wherein the eccentric bore comprises a step.

5. Fastening system according to claim 1, wherein the through-opening comprises a shoulder.

6. Fastening system according to claim 5, wherein the through-opening is formed on a first side of the shoulder as a slot.

7. Fastening system according to claim 6, wherein the through-opening is formed on a second side of the shoulder as a circular hole.

8. Fastening system according to claim 1, wherein the eccentric comprises the following:
   a sleeve with an eccentric bore;
   a torque-transmitting element which is arranged on one axial end of the sleeve; and
   wherein the bore extends through the sleeve and through the torque-transmitting element.

9. Fastening system according to claim 1, wherein the through-opening for receiving a clamping element and a sleeve of an eccentric comprises a shoulder, and wherein the opening is formed, on a first side of the shoulder, as a slot and, on a second side of the shoulder, as a circular hole.

10. Method for the fastening of a linear machine element comprising a toothed rack or a linear guide with at least one through-opening in a machine bed using the fastening system according to claim 1, the method comprising the steps of:
   orienting the machine element in the machine bed;
   inserting the clamping element into the at least one through-opening of the machine element;
   inserting the at least one eccentric into the at least one through-opening of the machine element and mounting the eccentric on the head of the clamping element;
   orienting the eccentric in the through-opening in order to position the machine element; and
   tightening the clamping element in order to fix the machine element in the machine bed.

11. Fastening system for a linear machine element having a toothed rack or a linear guide for fastening in a machine bed, comprising:
   a clamping element having a shank and a head, wherein the head has a diameter which is greater than the shank diameter;
   an eccentric comprising a sleeve having an eccentric bore and a torque-transmitting element, wherein the torque-transmitting element is arranged concentrically with respect to the eccentric bore, wherein the diameter of the head is smaller than the eccentric bore diameter; and
   a linear machine element having a through-opening in which the clamping element and the sleeve of the eccentric are received.

* * * * *